United States Patent

[11] 3,537,360

| [72] | Inventor | Robert M. Farnam |
| | | Palo Alto, California |
| [21] | Appl. No. | 781,025 |
| [22] | Filed | Dec. 4, 1968 |
| [45] | Patented | Nov. 3, 1970 |
| [73] | Assignee | Crown Zellerbach Corporation |
| | | San Francisco, California |
| | | a corporation of Nevada |

[54] PLASTIC BAG MANUFACTURING METHOD AND APPARATUS
14 Claims, 10 Drawing Figs.

[52] U.S. Cl. .............................................. 93/33,
93/1, 93/35, 93/58, 93/59

[51] Int. Cl. ..................................................... B31b 1/22,
B31b 1/64, B31b 49/04

[50] Field of Search....................................... 93/(IG),
33, 35(DS & RB), 58(SB), 59(MT), (DIG) 1

[56] References Cited
UNITED STATES PATENTS

| Re.26,075 | 9/1966 | Canno..................... | 93/33X |
| 3,102,632 | 9/1963 | Moser........................... | 93/58(.6)UX |
| 3,196,757 | 7/1965 | Samways...................... | 93/35(DS)UX |
| 3,395,622 | 8/1968 | Kugler......................... | 93/35(RB)UX |
| 3,406,610 | 10/1968 | Golden........................ | 93/35(DS)UX |
| 3,426,505 | 2/1969 | Cloud......................... | 93/58(.6)UX |
| 3,466,981 | 9/1969 | Honsel........................ | 93/35(RB)UX |

*Primary Examiner*—Wayne A. Morse, Jr.
*Attorneys*—Stanley Bialos, Corwin R. Horton and William K. Quarles

ABSTRACT: The bond is broken between edges of the inside plies of a gusset having inwardly reentrant folds normally bonded together by conventional heat sealing and severing means which removes substantially triangular areas from the gusset in the conventional manufacture of square bottom bags from plastic sheet material, to enable opening of the bag. This is accomplished by a pointed separating member positioned between the inside plies with the point in alignment with the gusset fold, and moving the sheet past said member. The point is guided between such inside plies by a wire connected thereto and maintained under tension along the gusset fold.

Patented Nov. 3, 1970

INVENTOR.
Robert M. Farnam
BY Stanley Bialos
Corwin R. Horton
William N. Quarles
Attorneys

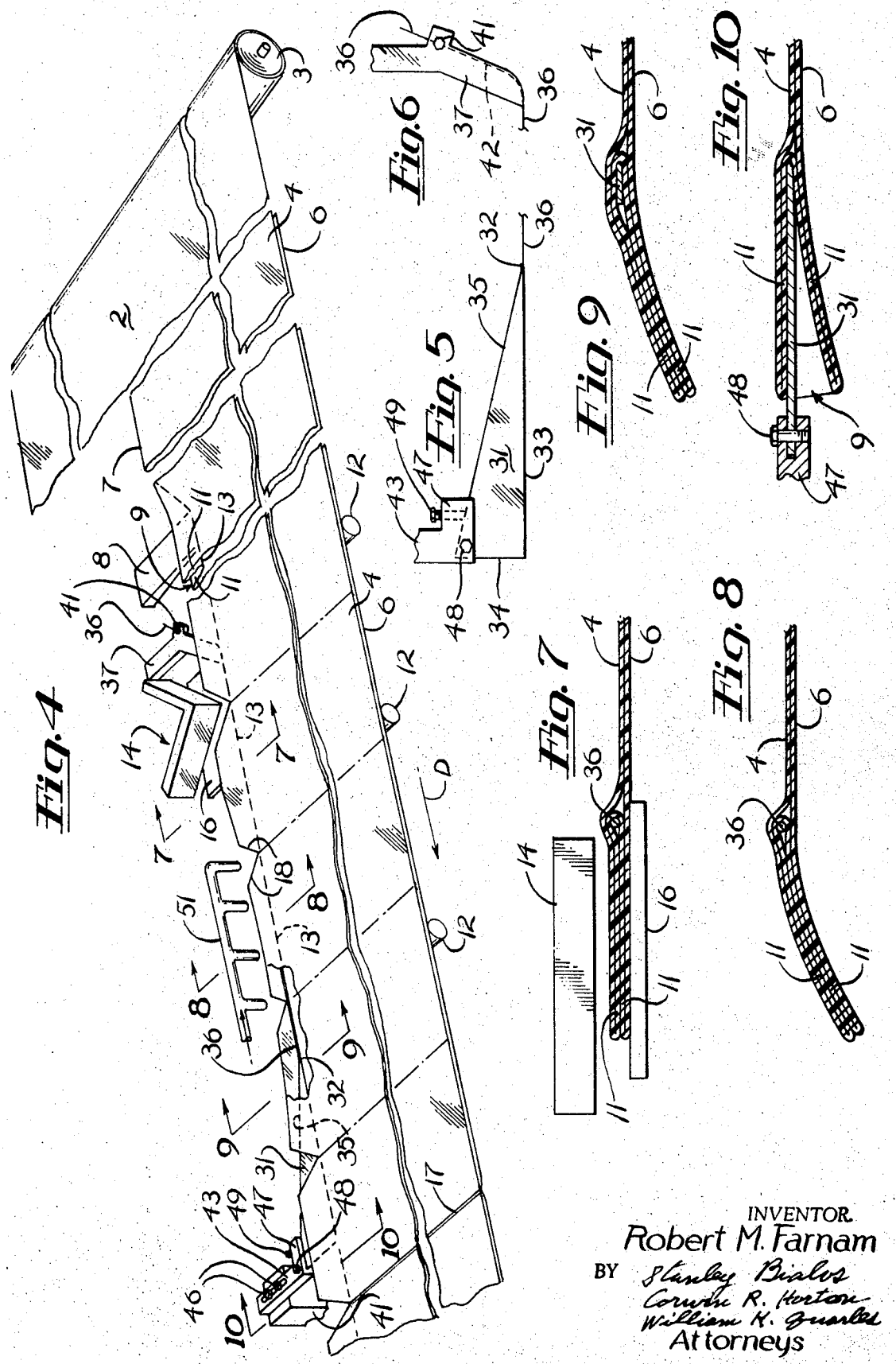

3,537,360

PLASTIC BAG MANUFACTURING METHOD AND APPARATUS

BACKGROUND OF THE INVENTION

This invention relates to the manufacture of square bottom bags from plastic heat sealable sheet material, such as Pliofilm and polyolefin film, for example, polyethylene and polypropylene. In the conventional manufacture of such type of bag, a web of relatively thin heat sealable film folded along one edge is moved by conventional apparatus in one general direction. As the folded web is thus moved, the fold is formed with a gusset having the shape of an accordian pleat with reentrant inside plies between overlying plies which form side walls of the bag.

At predetermined intervals, a conventional severing or cutting mechanism which includes a pair of knives arranged at a substantially right angle with respect to each other, sever substantially triangular sections from the gusset. The knives are heated so that as they cut they simultaneously bond or fuse together the edges of the triangular areas. The web is also severed transversely and bonded along lines extending from the apices of the respective triangular areas to provide individual bags. In order to form the square bag bottom, it is necessary that the seal or bond between the surfaces of the inside gusset plies along such edges be broken to insure full opening of the bag.

Heretofore, packagers have relied on breaking the bond when goods were pushed into the bag against the bottom gusset. Frequently, when using automatic packaging equipment, the goods would fail to break the bond properly so that they could not be inserted completely within the bag. Also, a release coating has been applied to the contiguous surfaces of the inside plies in an effort to prevent bonding, as is disclosed in the Piazze U.S. Pat. No. 3,023,679, dated March 6, 1962. However, the release coatings alone are not all to be desired.

SUMMARY AND OBJECTS OF THE INVENTION

The invention hereof overcomes the foregoing problem by breaking the aforementioned bond on a conventional bagmaking machine as the bags are being made. Summarizing the same, it comprises a separating member which is mounted on the bagmaking machine and which is maintained in position between the aforementioned inside gusset plies so that the bond is broken as the web is moved past the separating member. Desirably, the separating member is in the form of a thin plate having a point; and it is advantageously in the shape of a right angle triangle, with one side thereof, the long side, positioned in line with the fold line of the gusset whereby the point is in alignment with such fold line.

Such separating member is positioned downstream of the heat sealing and severing means; and to guide the point for entrance between the inside plies, a fine wire extending along and in line with the gusset fold line between the plies is connected to the point, and is anchored under tension at a location upstream of the heat sealing and severing means. The wire being located substantially in line with the gusset fold line maintains a small opening at the gusset fold line into which the point of the separating member can enter.

At its end opposite the point, the separating member is at least as wide as the width of the gusset, and desirably slightly wider, to insure that the bond is broken all along the bonded side edges of the triangular areas. Mechanical breaking of the bond is effected best when the separating member is at a location whereat the heat sealable material forming the bond has cooled or set to a substantially nontacky state. Consequently, the separating member is positioned desirably at such location.

From the preceding, it is seen that the invention has as its objects, among others, the provision of an improved method and apparatus for mechanically breaking the bond along the side edges of a gusset having inside plies in the manufacture of square bottom bags from heat sealable sheet material; which are simple and economical, permitting breaking of the bond to be effected on the bagmaking machine without damaging the bags; and easy to operate or install in combination with such machine.

Other objects will become apparent from the following more detailed description and accompanying drawings in which:

FIG. 4 is a fragmentary schematic isometric view of a conventional form of square bottom bag manufacturing machine in association with the apparatus hereof for breaking the aforementioned bond;

FIG. 5 is a fragmentary plan view of an advantageous form of separating member illustrating its mounting on a bracket support therefor;

FIG. 6 is a similar view of wire anchoring means;

FIG. 7 is a transverse section taken in plane indicated by line 7–7 in FIG. 4;

FIG. 8 is a transverse section taken in a plane indicated by line 8–8 in FIG. 4;

FIG. 9 is a similar section taken in a plane indicated by line 9–9 in FIG. 4; and FIG. 10 is likewise a transverse section taken in a plane indicated by line 10–10 in FIG. 4.

Figure 1:
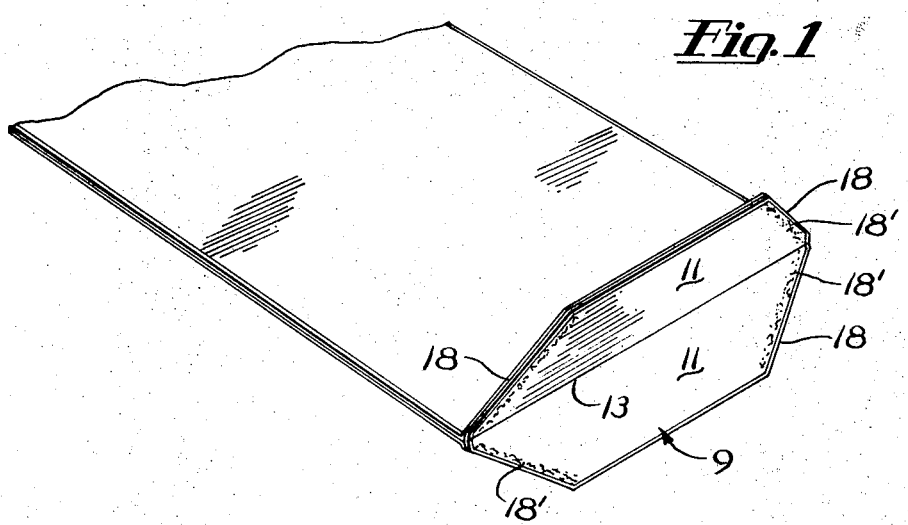
FIG. 1 is a fragmentary perspective view of the bottom portion of a conventional square bottom bag of heat sealable material, illustrating the bottom gusset partially unfolded.

Although the invention hereof can be attached to a conventional machine wherein square bottom bags are made from a tube of heat sealable sheet material by splitting it longitudinally in half as disclosed in the aforementioned U.S. Pat. No. 3,023,679, it is illustrated herein as an attachment on a conventional machine wherein the bags are formed from a flat sheet of heat sealable material, such as polyethylene. Referring to FIG. 4, a flat film 2 of the heat sealable material is unwound by conventional mechanism from a parent roll 3 thereof. The sheet is moved in one general direction illustrated by direction arrow D with an intermittent motion so that it has periods of rest. Suitable conventional mechanism (not shown) folds the sheet longitudinally to provide two overlying plies 4 and 6 folded together along one edge 7.

As the sheet is moved, suitable plow mechanism, as in the aforementioned U.S. Pat. No. 3,023,679, including creasing member 8 forms a continuous accordian pleat gusset 9 having reentrant inside plies 11 inwardly folded between overlying plies 4 and 6; the web passing over suitable spaced apart support rollers 12.

Figure 3:
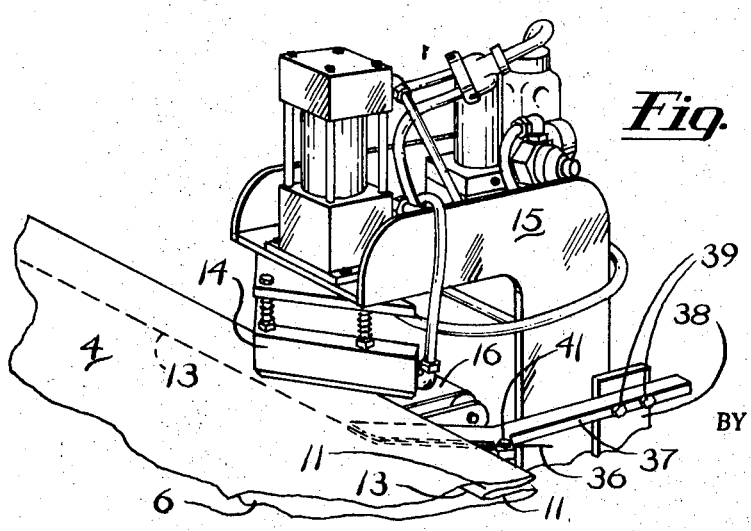
FIG. 3 is a more or less schematic isometric view of conventional heat sealing and severing means which bond the plies of the gusset together along the edges of triangular areas removed from the gusset, and illustrating in association therewith anchoring means for wire which guides or pilots a separating member between the inside plies of the gusset.

When the web is at rest, severing and heat sealing means including heated knives 14 arranged at a right angle with respect to each other, sever substantially right triangular areas (so-called chips) from the gusset at spaced intervals; the knives working against a support 16 and being moved up and down in timed relationship with movement of the web by conventional means in heat sealer 15 shown in FIG. 3. These severed triangular areas are removed by suitable means (not shown) such as vacuum means. Individual bags are made by transverse cuts and welds 17 formed by a transverse heated knife (not shown).

As a result of the heat sealing, all the plies of the gusset including the inside plies 11 are bonded together along their side edges 18 adjacent the respective severed triangular areas. In heretofore conventional manufacture, the bond along side edges 18 of inside gusset plies 11 has not been broken. It must be broken to enable the bag to be fully set up to the square bottom position shown in FIG. 2. In this connection, the stippling 18' in FIG. 1 indicates, the areas along the side edges of the inside gusset plies 11 which are bonded together before breaking of the bond.

Figure 2:
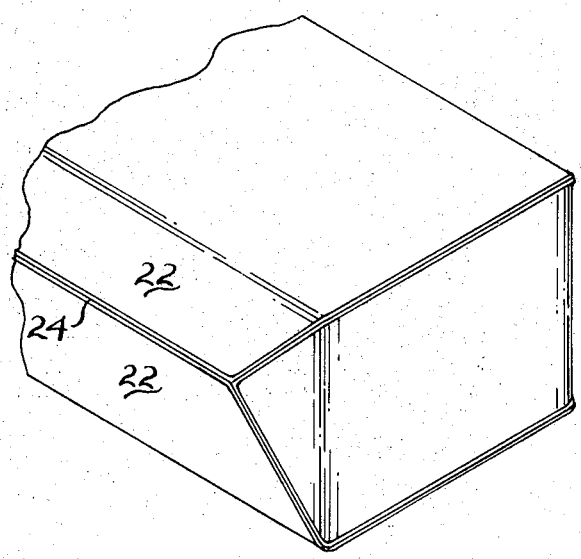
FIG. 2 is a similar view with the bottom completely unfolded.

The means hereof for breaking the bond along inside ply edges 18 enables the bag to be readily opened to full square bottom condition shown in FIG. 2. When so opened the outer end portions of the inside gusset plies 11 form the bottom part of the side wall portions 22 of the bag. These side wall portions are bonded together by seam 24 formed by the aforementioned heat sealing and severing knife at 17 (FIG. 4).

Such bond breaking means comprises a thin separating plate 31 desirably angular to form a point 32. Advantageously, plate 31 is a right angle triangle having a rounded long side 33 to prevent snagging, a short side 34, and outwardly slanting hypotenuse 35 which is also rounded to prevent snagging.

With reference to FIG. 4, it will be noted that plate 31 is positioned downstream of severing and heat sealing knife 14 being maintained fixedly in position, by adjustable means to be described, between inside plies 11 of the gusset with long side 33 extending alongside gusset fold 13 in alignment therewith, and with point 32 also in alignment with such gusset fold. Short edge 34 which is opposite point 32, is at least as wide as the gusset fold, and desirably extends beyond the fold to insure complete breaking of the bond along the side edges of the inner gusset plies 11 as the web is moved past the separating member.

After the triangular areas are removed from the gusset fold, the gusset portion is unsupported and free to hang downwardly as indicated in FIG. 8. Therefore, means is provided to form an opening for and guiding point 32 for entrance between inside gusset plies 11, comprising a thin, desirably flexible wire 36 also positioned between inside plies 11 along the fold line 13 in alignment therewith. Wire 36 is fixedly connected to point 32, and an anchoring member 37 positioned between plies 11 upstream of the heat sealing and severing knives 14; the wire being maintained taut under tension by means to be described.

Separating plate 31 is of relatively thin sheet metal having smooth surfaces, desirably about 16 gauge but this dimension is not critical, and may vary. As previously related, side 33 of the plate is rounded to preclude possible snagging or cutting of gusset fold line 13. The angle between the hypotenuse 35 and the opposite side 33 is preferably not greater than about 15° to facilitate entrance of plate 31 between plies 11 of the gusset. However, such angle is not critical. As separating plate 31 breaks the bond between side edges 18 of inside gusset plies 11; there is a tendency for the web to be pulled laterally outwardly as it passes over outwardly slanting side 35. However, since long side 33 of the separating member and wire 36 are maintained in alignment with gusset fold line 13, such lateral shifting is prevented.

Wire 36 is desirably metal of about 0.020 inches diameter, but such size is not critical as long as the wire is sufficiently thin, and yet has sufficient strength to withstand tension. It is connected to plate 31 by any suitable means so as to extend from its point 32, desirably by silver solder which is smoothed and polished at the connection point to minimize friction.

Anchoring member 37 is mounted for lateral adjustment with reference to the web to insure proper positioning of the wire along the fold line 13 of the gusset, by means of a bracket 38 (FIG. 3) to which the anchoring member is clamped by cap screws 39 which pass through enlarged holes in the anchoring member to provide for such lateral adjustment; and wire 36 is maintained clamped tight under tension by means of set screw 41 on the anchor. The wire seats in a groove 42 in the inner end of the anchor and along the outer edge thereof.

The aforementioned means for adjustably but fixedly mounting separating plate 31 so as to maintain proper alignment of long side 33 and point 32 thereof with inner fold line 13 of the gusset, comprises a bracket 43 mounted for lateral adjustment with reference to the web, on a support 44 by means of clamping screws 46 passing through enlarged slots in the bracket. The inner end of bracket 43 has a slotted leg 47 in which plate 31 is clamped by means of clamping bolt 48 about which the plate 31 can pivot. A set screw 49 in leg 47 enables a fine adjustment to maintain proper fixed alignment of side 33 with gusset fold line 13.

In positioning plate 31, bracket 43 is first set to an approximate position and point 32 is aligned with fold line 13 by pivoting plate 31 about bolt 48 while adjusting set screw 49. Bolt 48 is then tightened to clamp plate 31, and final adjustment is made by moving the bracket 43 laterally to a position at which the entire side 33 is in alignment with fold 13, and then fixing bracket 43 by tightening clamping screws 46. After the separating plate has been adjusted, the wire anchor 37 is adjusted in the manner described, and the wire 36 drawn taut, and clamped by set screw 41.

The spacing between heat sealing and severing means 14 and point 32 of the separating member is such that the heat sealable material of the web has cooled to nontacky state or in other words has set firmly because separation of the bond is facilitated. With the aid of cooling air blasts 51, cooling is effected rapidly. A distance between heat sealing knives 14 and point 32 of about 1½ to 2 feet is suitable for polyethylene bags of about 8 inches in width.

To enhance breaking of the aforementioned bond, a release coating, such as lacquer, is desirably provided on the facing surfaces of the inside plies 11, which will cover their lateral edges. Such coating weakens the bond effected by the heat sealing means. Printing ink employed on heat sealable plastic bags has also been found to provide a satisfactory coating for this purpose, and if employed, the stock from which the bags are formed may be printed beforehand in the usual manner. Also, to facilitate entrance of separating member 31 between the inside plies 11 of the gusset, it may be coated with a slip producing agent, such as Teflon, to minimize friction.

I claim:
1. In the method of manufacturing substantially square bottom bags from a web of heat sealable sheet material wherein overlying plies of said web are inwardly folded along an edge to form a gusset fold having reentrant inside plies, the web is moved in one general direction, substantially triangular areas are severed from the gusset at intervals along said web by heat sealing and severing means which bond together the edges of the triangular areas; the improvement which comprises breaking the bond between the inside gusset plies along the edges of the triangular areas by positioning a separating member between said inside plies downstream of said heat sealing and severing means, and moving said web past said member.

2. The method of claim 1 wherein the bond between said inside plies is broken after the heat sealable material forming said bond has cooled to a substantially nontacky state.

3. The method of claim 1 comprising effecting entrance of said separating member between said inside plies by providing a point thereon, maintaining alignment of the point with the fold line of the gusset, guiding the separating member between said inside plies by positioning a wire between said inside plies along said fold line and which is connected at one end thereof to the separating member and maintained in alignment with its point, and anchoring said wire between said inside plies at a location upstream of said heat sealing and severing means.

4. The method of claim 3 wherein said wire is maintained under tension.

5. The method of claim 3 comprising effecting said entrance of the point of said separating member at a downstream location whereat the heat sealable material forming the bond has cooled to a substantially nontacky state.

6. The method of claim 3 wherein the separating member is a thin plate which opposite the point thereof is at least as wide as the width of the gusset to break the bond all along said edges of the triangular areas.

7. The method of claim 6 wherein the separating member is angularly shaped to form said point, with one side of the angle positioned along said gusset fold line and the opposite side of said angle slanting outwardly; and entrance of the point between said inside gusset plies is effected at a downstream location whereat the heat sealable material forming the bond has cooled to a substantially nontacky state.

8. The method of claim 3 comprising effecting a relatively weak bond along said edges of the inside gusset plies to enhance breaking of the bond by providing a release coating on the facing surfaces of said inside plies.

9. The method of claim 8 wherein the release coating is printing.

10. In apparatus for manufacturing substantially square bottom bags from a web of heat sealable sheet material having overlying plies inwardly folded along an edge to form a gusset fold having reentrant inside plies, comprising means for intermittently moving said web in one general direction, and heat sealing and severing means at a predetermined location for severing substantially triangular areas from the gusset and which bond together the edges of the triangular areas while the web is at rest; the improvement comprising a separating member positioned between the inside gusset plies at a location downstream of said heat sealing and severing means for breaking the bond between said inside plies as they are moved therepast.

11. The improved apparatus of claim 10 wherein the separating member is pointed, and means is provided to support said member with the point in alignment with the fold line of the gusset.

12. The improved apparatus of claim 11 wherein said separating member is substantially triangular.

13. The improved apparatus of claim 11 wherein a wire between said inside plies along said fold line is connected to said separating member at one end thereof in alignment with said point to guide the separating member between said inside plies, and means is provided to anchor said wire between said inside plies at a location upstream of said heat sealing and severing means.

14. The improved apparatus of claim 13 wherein means is provided for adjustably mounting said wire anchoring means laterally with respect to said web, and means is provided on said anchoring means to clamp said wire.